US009518493B2

(12) United States Patent
Hodgson et al.

(10) Patent No.: US 9,518,493 B2
(45) Date of Patent: Dec. 13, 2016

(54) METHOD AND EXHAUST-GAS TREATMENT DEVICE FOR REGENERATING AN EXHAUST-GAS PURIFICATION COMPONENT AND MOTOR VEHICLE HAVING THE EXHAUST-GAS TREATMENT DEVICE

(71) Applicant: EMITEC GESELLSCHAFT FUER EMISSIONSTECHNOLOGIE MBH, Lohmar (DE)

(72) Inventors: Jan Hodgson, Troisdorf (DE); Christian Vorsmann, Cologne (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 54 days.

(21) Appl. No.: 13/647,529

(22) Filed: Oct. 9, 2012

(65) Prior Publication Data
US 2013/0031894 A1 Feb. 7, 2013

Related U.S. Application Data

(63) Continuation of application No. PCT/EP2011/054310, filed on Mar. 22, 2011.

(30) Foreign Application Priority Data

Apr. 7, 2010 (DE) .................. 10 2010 013 990

(51) Int. Cl.
*F01N 3/027* (2006.01)
*F01N 3/28* (2006.01)
(Continued)

(52) U.S. Cl.
CPC ................. *F01N 3/28* (2013.01); *F01N 3/027* (2013.01); *F01N 3/031* (2013.01); *F01N 3/2053* (2013.01);
(Continued)

(58) Field of Classification Search
CPC .... F01N 3/0275; F01N 9/002; F01N 2240/16; F01N 2900/1606
(Continued)

(56) References Cited

U.S. PATENT DOCUMENTS 4,264,344 A 4/1981 Ludecke et al.
4,376,637 A * 3/1983 Yang .................. 95/74
(Continued)

FOREIGN PATENT DOCUMENTS

DE 31 02 225 A1 1/1982
DE 101 27 782 A1 1/2002
(Continued)

OTHER PUBLICATIONS

International Search Report of PCT/EP2011/054310, Dated July 15, 2011.
(Continued)

Primary Examiner — Jorge Leon, Jr.
(74) Attorney, Agent, or Firm — Laurence A. Greenberg; Werner H. Stemer; Ralph E. Locher

(57) ABSTRACT

A method and an exhaust-gas treatment device for regenerating an exhaust-gas purification component include charging at least one capacitor and heating at least one sub-volume of the exhaust-gas purification component to at least 900° C. by supplying at least a part of the energy stored in the capacitor. A particle burn-off reaction can be started from the at least one sub-volume for a large volume of exhaust-gas purification components. Exhaust-gas purification components in an exhaust system of an internal combustion engine can thus be completely regenerated in an energy-efficient manner. A vehicle having the exhaust-gas treatment device and carrying out the method is also provided.

23 Claims, 3 Drawing Sheets

(51) Int. Cl.

| | | |
|---|---|---|
| *F01N 3/031* | (2006.01) | |
| *F01N 3/20* | (2006.01) | |
| *F01N 9/00* | (2006.01) | |
| *F01N 13/00* | (2010.01) | |
| *F01N 13/04* | (2010.01) | |

(52) U.S. Cl.
 CPC ............... *F01N 9/002* (2013.01); *F01N 13/00* (2013.01); *F01N 13/017* (2014.06); *F01N 13/04* (2013.01); *F01N 3/0275* (2013.01); *F01N 2240/16* (2013.01); *F01N 2340/00* (2013.01); *F01N 2410/00* (2013.01); *F01N 2900/1606* (2013.01); *Y02T 10/47* (2013.01)

(58) Field of Classification Search
 USPC ................. 60/274, 275, 286, 287, 288, 289, 291, 60/295, 296, 297, 299, 300, 303, 311, 320
 See application file for complete search history.

(56) References Cited

U.S. PATENT DOCUMENTS

| | | | |
|---|---|---|---|
| 4,641,496 A * | 2/1987 | Wade | 60/374 |
| 4,788,819 A * | 12/1988 | Henkel | 60/303 |
| H001113 H * | 12/1992 | Yoshizaki | 60/284 |
| 5,195,317 A * | 3/1993 | Nobue et al. | 60/275 |
| 5,571,298 A * | 11/1996 | Buck | 55/282.3 |
| 5,651,248 A | 7/1997 | Kawamura | |
| 6,185,932 B1 * | 2/2001 | Park et al. | 60/284 |
| 7,029,510 B2 | 4/2006 | Fränkle et al. | |
| 7,055,314 B2 | 6/2006 | Treiber | |
| 7,174,708 B2 | 2/2007 | Bardon et al. | |
| 7,373,917 B2 * | 5/2008 | Ellinger et al. | 123/295 |
| 7,469,532 B2 | 12/2008 | Williamson et al. | |
| 7,900,443 B2 * | 3/2011 | Stieglbauer | 60/297 |
| 8,015,802 B2 * | 9/2011 | Nishiyama et al. | 60/286 |
| 2002/0113051 A1 | 8/2002 | Wilkens et al. | |
| 2004/0025500 A1 | 2/2004 | Bardon et al. | |
| 2004/0216448 A1 * | 11/2004 | Brillant | F01N 13/0097 60/274 |
| 2005/0126160 A1 | 6/2005 | Goldschmidt et al. | |
| 2010/0205943 A1 * | 8/2010 | Gonze | F01N 3/0256 60/286 |
| 2010/0275585 A1 | 11/2010 | Burkhardt | |
| 2011/0214413 A1 | 9/2011 | Hodgson et al. | |

FOREIGN PATENT DOCUMENTS

| | | |
|---|---|---|
| DE | 201 17 659 U1 | 1/2002 |
| DE | 10 2006 044 503 A1 | 4/2007 |
| DE | 102007028915 A1 | 12/2008 |
| DE | 202007016125 U1 | 5/2009 |
| DE | 102008057960 A1 | 5/2010 |
| EP | 0 699 827 A1 | 3/1996 |
| JP | S59158314 A | 9/1984 |
| JP | 7011937 A | 1/1995 |
| JP | H07504256 A | 5/1995 |
| JP | 2004522887 A | 7/2004 |
| JP | 2004300942 A | 10/2004 |
| JP | 2005505737 A | 2/2005 |
| JP | 2005520098 A | 7/2005 |
| JP | 20054521821 A | 7/2005 |
| JP | 2008008239 A | 1/2008 |
| WO | 9407008 A1 | 3/1994 |

OTHER PUBLICATIONS

R. Koetz, et al., "Supercaps—Properties and Vehicle Application", VDI-Berichte Nr. 1874, pp. 175-188, Paul Scherrer Inditut, Villigen, Switzerland, 2005. English abstract.

* cited by examiner

METHOD AND EXHAUST-GAS TREATMENT DEVICE FOR REGENERATING AN EXHAUST-GAS PURIFICATION COMPONENT AND MOTOR VEHICLE HAVING THE EXHAUST-GAS TREATMENT DEVICE

CROSS-REFERENCE TO RELATED APPLICATION

This is a continuation, under 35 U.S.C. §120, of copending International Application No. PCT/EP2011/054310, filed Mar. 22, 2011, which designated the United States; this application also claims the priority, under 35 U.S.C. §119, of German Patent Application DE 10 2010 013 990.4, filed Apr. 7, 2010; the prior applications are herewith incorporated by reference in their entirety.

BACKGROUND OF THE INVENTION

Field of the Invention

The present invention relates to a method for the regeneration of an exhaust-gas purification component and to an exhaust-gas treatment device which includes an exhaust-gas purification component and an ignition device. The invention also relates to a motor vehicle having the exhaust-gas treatment device and carrying out the method.

The exhaust gas of internal combustion engines generally contains particles. In the case of a diesel engine, the particles are, in particular, hydrocarbon compounds (such as, in particular, ash, soot etc.) but also sulfates, nitrates, organic compounds and the like. In internal combustion engines, in particular in diesel engines, as a consequence of more stringent emissions limit values, it is necessary for particles contained in the exhaust gas to be removed from the exhaust-gas flow and to be retained and/or converted in the exhaust line. A multiplicity of different particle separators or particle filters are known for that purpose. Specifically in the case of porous and/or closed filter systems (such as, for example, so-called wall-flow filters, depth filters, etc.), it is necessary to ensure that the filter systems do not become blocked during the operation of the exhaust system.

Furthermore, it must be taken into consideration that the particles of the exhaust gas may also at least partially accumulate on catalytically active surfaces (for example on catalyst carrier bodies).

For this reason, it is known that the particles which have accumulated in or on an exhaust-gas purification component of that type must be at least intermittently removed, which is also referred to as the regeneration of the exhaust-gas purification component. This preferably takes place by virtue of the particles being burned off, that is to say oxidized. For this purpose, relatively high temperatures are generally required, which can be attained by virtue of the exhaust-gas purification component and/or the exhaust gas in the vicinity of the particles to be burned being heated in a targeted manner.

In order to heat an exhaust-gas purification component, it is known for the carrier structure to be formed with an electric heater, which is activated according to demand. A corresponding example for an open particle filter is presented in German Utility Model DE 201 17 659 U1, corresponding to U.S. Pat. No. 7,055,314. In the case of a closed filter system, reference is made herein, for example, to German Patent Application DE 10 2006 044 503 A1, corresponding to U.S. Pat. No. 7,469,532. In those systems, however, increased technical outlay and energy consumption must be taken into consideration.

Furthermore, it is known to bring about an exothermic reaction in a targeted manner on or in the vicinity of the exhaust-gas purification component to be regenerated, for example by virtue of hydrocarbons being brought into contact with an oxidation catalytic converter (which has high-grade metal). The exothermic reaction leads to heating of the exhaust gas and can thus assist the desired regeneration. It must be noted herein that the additional injection of fuel and, if appropriate, also the introduction of oxygen into the exhaust line can result in the generation of an exhaust-gas composition which is unsuitable for catalytic converters, and therefore also poorer exhaust-gas qualities.

The problems already discussed above with regard to the regeneration make it clear that there is a demand for improvement in that case. In particular, the above-mentioned apparatuses and methods are susceptible to failure if the exhaust system is traversed by exhaust gas with a relatively high throughput and low temperatures. Specifically in the case such as arises, in particular, in relatively new diesel engines, the cooling action of the exhaust gas on the electrical heating systems is considerable.

SUMMARY OF THE INVENTION

It is accordingly an object of the invention to provide a method and an exhaust-gas treatment device for regenerating an exhaust-gas purification component and a motor vehicle having the exhaust-gas treatment device, which overcome the hereinafore-mentioned disadvantages and at least partially solve the highlighted problems of the heretofore-known methods, devices and vehicles of this general type and which permit a conversion of accumulated soot or hydrocarbon particles with simple technical apparatuses and the lowest possible expenditure of energy.

With the foregoing and other objects in view there is provided, in accordance with the invention, a method for regenerating an exhaust-gas purification component. The method comprises at least the following steps:

i) charging at least one capacitor to store energy therein; and ii) heating at least one sub-volume of the exhaust-gas purification component to at least 900° C. [degrees Celsius] through a supply of at least a part of the energy stored in the capacitor.

An exhaust-gas purification component is to be understood to mean at least one of the following components: honeycomb body, filter, separator, catalyst carrier body, adsorber or flow mixer. The exhaust-gas purification components are generally disposed in the exhaust line or in an exhaust-gas recirculation line of an internal combustion engine and are thus exposed to the exhaust gas.

The capacitor is a (passive) electrical component with the capability of storing electrical charge, and thus energy, and releasing the charge or energy again when required. The capacitor is preferably charged with the on-board voltage of a motor vehicle, which is presently 12 V. The capacitor may alternatively be charged with a higher voltage generated through the use of a DC-DC converter. In order to obtain a higher output voltage during the supply of the energy, it is possible for multiple series-connected capacitors to be charged in each case individually with the on-board voltage and to be discharged jointly in series connection.

A sub-volume or partial volume of the exhaust-gas purification component is to be understood to mean a space within an outer housing of the exhaust-gas purification component, which space is smaller than the total volume of the exhaust-gas purification component (including a wall structure and flow passages embedded therein for the exhaust gas). This means, in particular, that both a component of the exhaust-gas purification component and also media such as for example air, exhaust gas or accumulated soot/hydrocarbon particles may be present in the sub-volume. The sub-volume is defined, in particular, as the space through which electrical current flows, and in the process is directly heated by the electrical current flow, when electrical energy is supplied.

It is possible for one capacitor to supply energy to a multiplicity of sub-volumes simultaneously, although it may also be provided that a single capacitor is assigned to each sub-volume. It is, however, basically desirable for the at least one capacitor to be the only energy source for supplying electrical energy to the sub-volume.

As a result of the increase in the temperature of the sub-volume, at least those particles which have accumulated in the sub-volume and the particles which have accumulated adjacent the sub-volume are converted. The conversion of the particles generally means that they are at least partially converted into gaseous constituents. It is preferable in this case for the temperature in the sub-region to reach at least 950° C., particularly preferably at least 1000° C. At a temperature of over 900° C., even regions of accumulated soot which are further remote from the sub-volume are heated through heat conduction and/or heat radiation.

The method proposed herein is distinguished, in particular, in that brief heating of the sub-volume, which in particular lasts only a few seconds, is realized through the use of the at least one capacitor. Through the use of such a capacitor discharge, it is possible, for example, in less than 3 seconds, or preferably in a maximum of 1 second, for there to be introduced into the (correspondingly limited, small) sub-volume a peak current which is high enough that the temperatures required for the regeneration can be attained. A peak current suitable for this purpose may have a value of greater than 50 A [amperes], preferably at least 70 A or even at least 100 A. In particular, an electrical discharge of considerably greater than 500 Watts, for example even greater than 900 Watts, is briefly attained.

In this case, it must be taken into consideration, in particular, that the method according to the invention is carried out during the operation of the motor vehicle or while there is an exhaust-gas flow in the exhaust system. Specifically this aspect hinders a fast active regeneration of the exhaust-gas purification component because, in this way, the reactivity of the exhaust-gas purification component and/or the temperature of the exhaust-gas purification component are reduced.

In accordance with another mode of the invention, it is preferable if, proceeding from the at least one sub-volume, a particle burn-off reaction is started for a larger volume of the exhaust-gas purification component. As a result of the brief heating of the sub-volume, an exothermic reaction for the conversion of the particles is generated, for example, in the sub-volume, wherein the energy thereby released triggers a likewise exothermic reaction in the neighboring regions of the sub-volume. It is thus possible for all of the soot which has accumulated in the exhaust-gas purification component to be burned off or converted proceeding from the sub-volume. It is thus not necessary to heat all of the exhaust gas or the entire exhaust-gas purification component. Whereas it was accordingly the case in the past that the exhaust-gas purification component was heated for long periods of time, for example to a temperature of approximately only 600° C., it is the case herein that, with a brief initial ignition through the use of a peak discharge of the capacitor in the sub-volume, a complete regeneration of the exhaust-gas purification component is achieved in a highly expedient manner from an energy aspect. It has been found that a particle burn-off reaction is triggered in a particularly simple and comprehensive manner above a temperature of 900° C.

In accordance with a further particularly advantageous mode of the invention, at most 2,000 J [Joules], preferably at most 1,500 J, of electrical energy is supplied to the sub-volume. In some applications, it may also be adequate for a maximum of at most 1,000 J of electrical energy to be supplied. The electrical energy supplied may be determined from the energy flowing out of the at least one capacitor. The amount of energy output is sufficient to generate, in a corresponding sub-volume, a temperature which triggers a conversion of particles which can in turn completely regenerate an exhaust-gas purification component. In this way, in a short period of time, a particularly small amount of energy is consumed during the regeneration of an exhaust-gas purification component.

In accordance with an added advantageous mode of the invention, at least 63.2% of the energy previously stored in the capacitor is supplied to the exhaust-gas purification component within a maximum of 1 second. It is very particularly preferable for the amount of energy to be provided within at most 0.1 s or even within at most 0.01 s. As a result of the fast supply of energy, it is achieved, in particular, that the sub-volume to be heated cannot already be cooled to an excessive degree during the heating process by the exhaust gas flowing past, so that the exothermic conversion can be triggered in a concentrated and reliable manner. A further increase in energy efficiency of the regeneration process can thus be attained.

It is furthermore advantageous for different sub-volumes to be heated in successive heating steps. The exhaust-gas purification component may have a plurality of heatable sub-volumes, so that energy is supplied in a targeted manner into those regions in which a particularly large amount of soot has accumulated. A spatially uniform regeneration of the exhaust-gas purification components is thus attained across multiple heating processes (which take place chronologically in succession). The different sub-volumes may be heated for this purpose through the use of the same capacitor, although it is also possible for each one of the sub-volumes to be assigned at least one separate capacitor.

In accordance with an additional preferable mode of the invention, at least one parameter of an internal combustion engine or exhaust system assigned to the exhaust-gas purification component is measured or calculated, and when a threshold value of the at least one parameter is reached, at least a part of the energy stored in the capacitor is supplied to the sub-volume.

The at least one parameter may, for example, include at least one of the following values: operating duration of the internal combustion engine, load of the internal combustion engine, particle content in the exhaust gas of the internal combustion engine, speed of the exhaust-gas flow, pressure drop across the exhaust-gas purification component, temperature of the exhaust gas, temperature of the exhaust-gas purification component or composition of the exhaust gas. The attaining, exceeding or undershooting of the predefined threshold value forms a reference value for the need for a regeneration, wherein if appropriate an evaluation of a plurality of the parameters also makes it possible to identify whether or not the ambient conditions in the sub-volume are suitable for enabling the energy provided in a short time by the capacitor to effect a desired regeneration. Furthermore, the parameters may be taken into consideration for defining the amount of energy and/or the energy supply time and/or the specific sub-volume (for example location, size, . . . ) presently required to achieve an effective and energetically expedient regeneration. The method is thus preferably carried out (repeatedly) during the operation of the internal combustion engine.

It is furthermore preferable for the capacitor to be recharged directly after discharging, for example through the use of a battery, an alternator or an energy recovery device, in such a way that the capacitor can be discharged immediately upon reaching the threshold value.

In accordance with yet another particularly advantageous mode of the invention, the at least one capacitor is to be charged with an initial power of at most 30 W [Watts]. It is very particularly preferable for the at least one capacitor to be charged with an initial power of at most 10 W or even only 1 W. An initial power of 10 W can be transmitted from an energy source of a motor vehicle to a possibly remote exhaust-gas purification component, at which the capacitor is disposed, using a conventional cable. Cables for transmitting high powers are therefore not required in this case.

With the objects of the invention in view, there is also provided an exhaust-gas treatment device for a secondary exhaust tract of an exhaust system of an internal combustion engine. The exhaust-gas treatment device comprises an exhaust-gas purification component having at least one sub-volume, and at least one ignition device having at least one ignition element associated with the at least one sub-volume, at least one capacitor connected to the at least one ignition element, at least one energy source connected to the at least one capacitor and at least one control device connected to the at least one capacitor.

A "secondary" exhaust tract means an exhaust line of an exhaust system through which (permanently) only a relatively small fraction of the exhaust gas is conducted, for example a maximum of 40%, preferably even only a maximum of 20% or even only a maximum of 10%. The fraction of the exhaust-gas volume flow which flows through the secondary exhaust tract may be actively varied and/or adjusted, although it is preferable for the geometry and configuration of the exhaust-gas system to be such that (permanently) only such a small fraction of the exhaust gas is supplied to the exhaust-gas purification component. Consequently, an exhaust system of that type generally has a main exhaust tract and at least one secondary exhaust tract, wherein the exhaust-gas purification component with the sub-volume to be heated is disposed in the secondary exhaust tract.

Ignition elements include, in particular, electrodes and/or heating wires which are disposed in the exhaust-gas purification component and which supply the electrical energy or thermal energy to the sub-volume of the exhaust-gas purification component in order to trigger at least a local regeneration of the deposited soot particles.

The at least one capacitor is preferably in the form of a double layer capacitor, also referred to as electrochemical double-layer capacitors or supercapacitors. Such a capacitor has a particularly high energy density. Its high capacity is based on the dissociation of ions in a liquid electrolyte, which ions form a dielectric of a few atom layers and a large electrode surface. Such capacitors are, like electrolyte capacitors, polarized components.

The on-board power system of the motor vehicle may be used, in particular, as an energy source. It is likewise possible to use other energy accumulators (for example a battery) or energy suppliers (generator, thermoelectric generator, etc.).

The control device may be integrated in the superordinate control device of the internal combustion engine (a so-called engine controller) and may, for example, measure parameters of the internal combustion engine and of the exhaust system through the use of suitable sensors and/or it may determine the parameters mathematically.

The exhaust-gas treatment device according to the invention is, in particular, suitable or even set up and configured, for being able to carry out the method according to the invention. The effects and variants explained for the method may thus also be taken into consideration for the description of the exhaust-gas treatment device, and vice versa.

The sub-volume may be a clearly delimited, if appropriate decoupled, region of the exhaust-gas treatment device. Furthermore, it is also possible for that sub-volume to be defined by the region of action of the ignition element, that is to say, in particular, the region to which energy is supplied directly (for example in electrical form).

In accordance with another preferable feature of the invention, the sub-volume has a volume of at most 1,000 $mm^3$ [cubic millimeters]. It has been found that, with the energy provided, a burn-off reaction can be initiated in such a sub-volume in order to bring about a complete regeneration of the exhaust-gas purification component.

The introduction of energy into the sub-volume may take place, for example, through the use of a heating wire which is formed with a length of at most 30 mm [millimeters], preferably at most 20 mm, and with a diameter of at most 2 mm, preferably at most 1 mm. The heating wire is, in particular, disposed in such a way that particles can preferably accumulate around it. Initially, only the heating wire is heated, as a result of the supply of energy to the heating wire. The particles which have accumulated in the direct vicinity of the sub-volume are heated by the heating wire to such an extent that they burn off and, through the exothermic reaction, (indirectly) initiate a conversion of the surrounding particles.

In a further embodiment, the sub-volume is delimited by two electrical contacts (electrodes), for example with a height of at most 8 mm, preferably at most 4 mm, with a width of at most 5 mm, preferably at most 4 mm, and with a spacing from one another of at most 25 mm, preferably at most 20 mm. During the discharging of the capacitor, an electrical current can flow between the two electrodes through the soot particles which have accumulated between the electrodes. As a result of the flow of electrical current, the soot particles are heated and thus trigger a soot burn-off reaction initially in the sub-volume, which reaction can then propagate further.

In accordance with a further feature of the invention, the capacitor has a capacitance of at most 500 F [Farads], preferably at most 100 F, particularly preferably at most 10 F. Capacitors with a low capacitance, in particular of less than 10 F, are inexpensive to obtain.

In accordance with an added particularly preferred feature of the invention, the exhaust system includes a radial catalytic converter with a first end side and a second end side, in which the exhaust-gas purification component is assigned, as an impactor, to the second end side.

In the case of a radial catalytic converter, the exhaust-gas flow from an internal combustion engine enters the catalytic converter centrally through the first end side and is diverted radially. In this case, the exhaust-gas treatment device is constructed in such a way that the predominant fraction of the exhaust gas is diverted and discharged (as a main exhaust-gas flow). Furthermore an impactor, which is provided opposite the first end side, is positioned in the secondary exhaust-gas flow, that is to say is impinged upon by only a relatively small fraction of the exhaust gas. Since a flow diversion is formed through the use of the radial catalytic converter and, for example, a large flow resistance is formed by the impactor, the desired splitting into a main flow and a secondary flow is attained. It is consequently preferable for the impactor to be in the form of a depth filter such as, for example, a filter plate or a filter foam, and/or to be formed in the manner of an impact plate for particles. With that configuration, it is achieved that a very large proportion of the particles present in the exhaust gas does not follow the flow diversion but rather accumulates on or in the impactor disposed opposite on the second end side. At least 90% of the particles contained in the exhaust gas can thus be accumulated on or in the (small) impactor. Specifically, the concentrated accumulation of the particles has the advantage that only a very small sub-volume need be heated for the initial ignition. The method according to the invention is thus suitable specifically for such a construction of the exhaust system.

With the objects of the invention in view, there is concomitantly provided a vehicle, comprising an exhaust-gas treatment device according to the invention which is set up or configured for carrying out the method according to the invention. The details and advantages disclosed for the method according to the invention can be transferred and applied to the exhaust-gas treatment device according to the invention and vice versa.

Other features which are considered as characteristic for the invention are set forth in the appended claims, noting that the features specified individually in the dependent claims may be combined with one another in any desired technologically meaningful way and define further embodiments of the invention.

Although the invention is illustrated and described herein as embodied in a method and an exhaust-gas treatment device for regenerating an exhaust-gas purification component and a motor vehicle having the exhaust-gas treatment device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
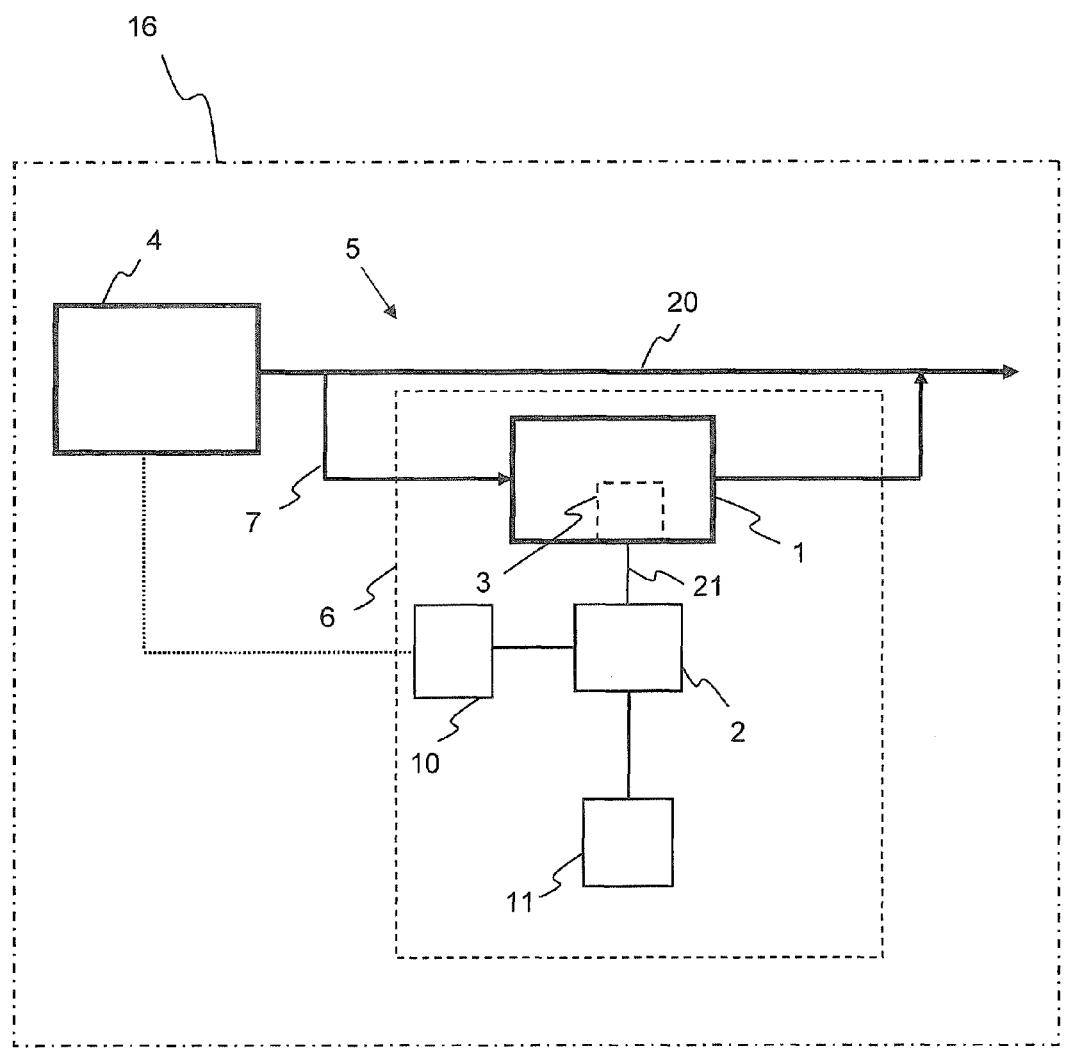
FIG. 1 is a block diagram of a motor vehicle having an exhaust-gas treatment device.

Referring now in detail to the figures of the drawing for explaining the invention and the technical field in more detail by showing particularly preferred structural variants to which the invention is not restricted, and first, particularly, to FIG. 1 thereof, there is seen a diagrammatically illustrated motor vehicle 16 having an internal combustion engine 4 to which an exhaust system 5 is connected. The exhaust system 5 includes a main exhaust tract 20 along which a major part of the exhaust gas is conducted and, if appropriate, treated, and a secondary exhaust tract 7 in which an exhaust-gas treatment device 6 according to the invention is disposed. The exhaust-gas treatment device 6 includes an exhaust-gas purification component 1 with a sub-volume 3, a capacitor 2, a control device 10 and an energy source 11. The capacitor 2 is connected to the sub-volume 3 through electrical lines 21. Furthermore, the capacitor is connected to the control device 10 and to the energy source 11. The control device 10 controls charging of the capacitor 2 by the energy source 11 and discharging of the capacitor 2 into the sub-volume 3. The control device 10 may furthermore be connected to a control device of the internal combustion engine 4, for an exchange of data.

The energy source 11 may, for example, be a battery, an alternator or an energy recovery device. The sub-volume 3 is a space in the exhaust-gas purification component 1. The space is formed from a component of the exhaust-gas purification component 1 or from a region between components of the exhaust-gas purification component 1. In this case, the sub-volume 3 is defined as a space which is directly heated by an input of energy from the capacitor 2. In particular, the sub-volume 3 is thus the space through which a current of the capacitor 2 flows.

During operation, the exhaust gas from the internal combustion engine 4 flows through the exhaust system 5, with only a small partial flow of the exhaust gas flowing through the secondary exhaust tract 7. In this case, the branching of the exhaust gas from the main exhaust tract 20 into the secondary exhaust tract 7 may be both actively controlled or predefined by the geometry of the exhaust system 5. The secondary partial flow of the exhaust gas flows through the exhaust-gas purification component 1 so that, in particular, soot and/or carbon particles accumulate in the exhaust-gas purification component 1. The exhaust-gas purification component 1 may, for example, be a filter which, if appropriate, has a catalytic coating.

In order to convert the accumulated soot (reference numeral 17 in FIGS. 3 and 4), electrical energy is supplied to the sub-volume 3 from the capacitor 2 through the electrical lines 21. The electrical energy heats the sub-volume 3 to a temperature of at least 900° C. The accumulated soot is converted at that temperature. Since the conversion is an exothermic reaction, the soot 17 surrounding the sub-volume is also (indirectly) heated, in such a way that a soot burn-off reaction propagates in the exhaust-gas purification component 1.

The supply of the energy stored in the capacitor 2 takes place preferably after threshold values of the parameters of the internal combustion engine 4 or of the exhaust system 5 are reached. The parameters may, for example, be the number of particles in the exhaust gas, the throughflow rate through the exhaust-gas purification component 1 and/or the pressure drop across the exhaust-gas purification component 1.

Figure 2:
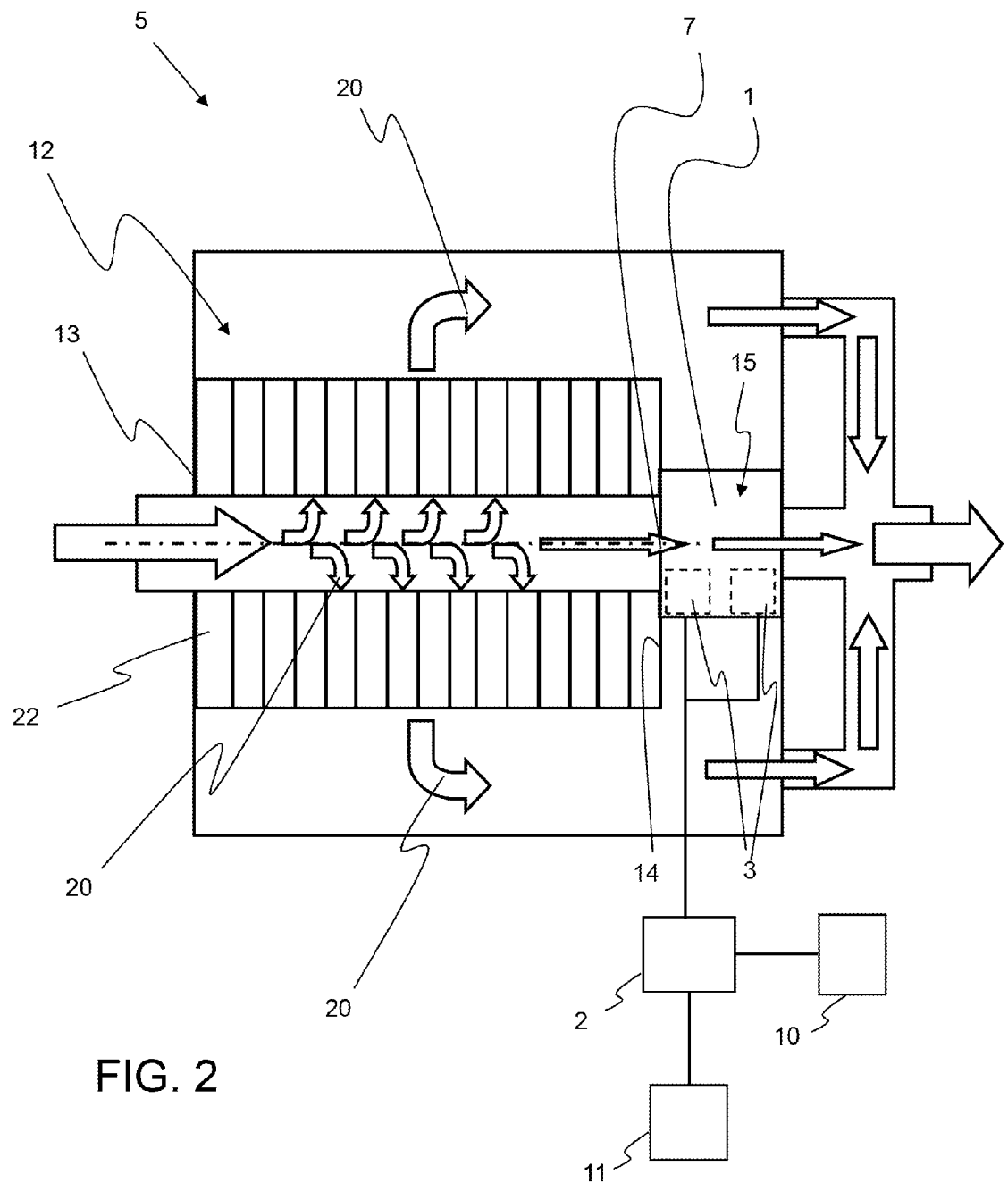
FIG. 2 is an enlarged, longitudinal-sectional view of an exhaust system having an exhaust-gas treatment device.

FIG. 2 diagrammatically shows a part of an exhaust system 5. The exhaust system 5 has a radial catalytic converter 12 with a first end side 13 and a second end side 14. Ducts 22, through which the exhaust gas flows radially, are formed in the radial catalytic converter 12. An exhaust-gas purification component 1 in the form of an impactor is disposed on the second end side 14 of the radial catalytic converter 12. The exhaust-gas purification component 1 has two sub-volumes 3 which are connected to the capacitor 2. The capacitor is furthermore connected to an energy source 11 and to a control device 10, as already described with regard to FIG. 1.

During operation, the exhaust gas flows into the radial catalytic converter 12 centrally through the first end side 13. The exhaust-gas flow is indicated therein by arrows. The exhaust-gas purification component 1 constitutes a flow resistance for the exhaust gas, so that the exhaust gas is diverted through the radially disposed ducts 22 of the radial catalytic converter 12. The more inert soot and/or carbon particles in the exhaust gas cannot follow the diversion and accumulate in the exhaust-gas purification component 1. The exhaust-gas purification component 1 thus forms merely a secondary exhaust tract 7 through which only a part of the exhaust gas flows. Due to the introduction of at least a part of the energy stored in the capacitor 2, at least a part of the accumulated soot 17 is heated to a temperature of at least 900° C., so that a soot burn-off reaction is initiated which ideally effects a complete conversion of the soot 17 accumulated in the exhaust-gas purification component 1.

Figure 3:
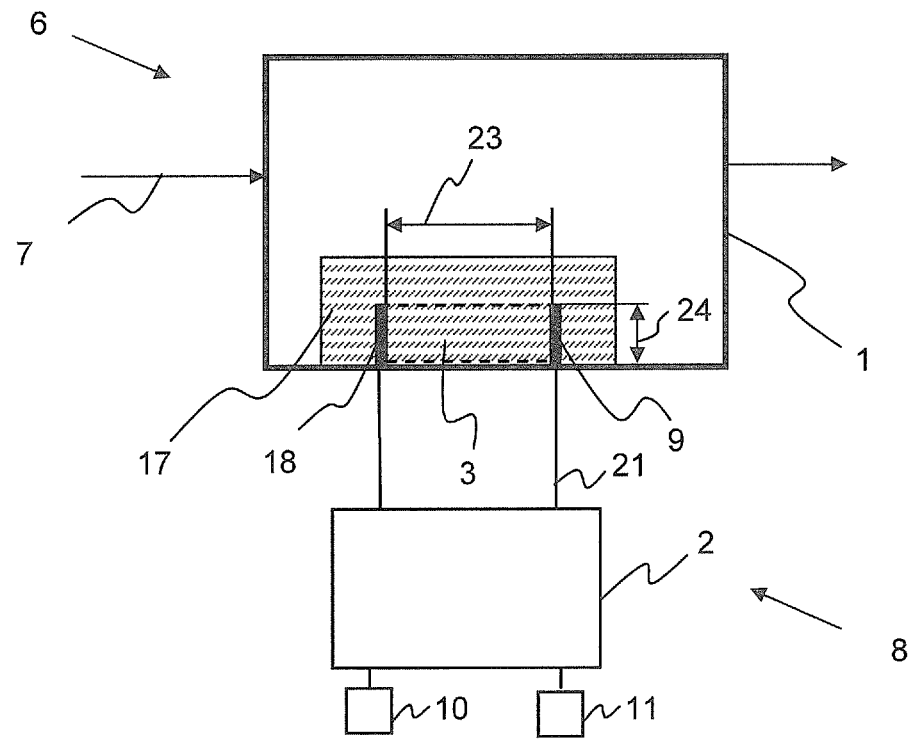
FIG. 3 is a sectional view of a further exemplary embodiment of an exhaust-gas treatment device.
Figure 4:
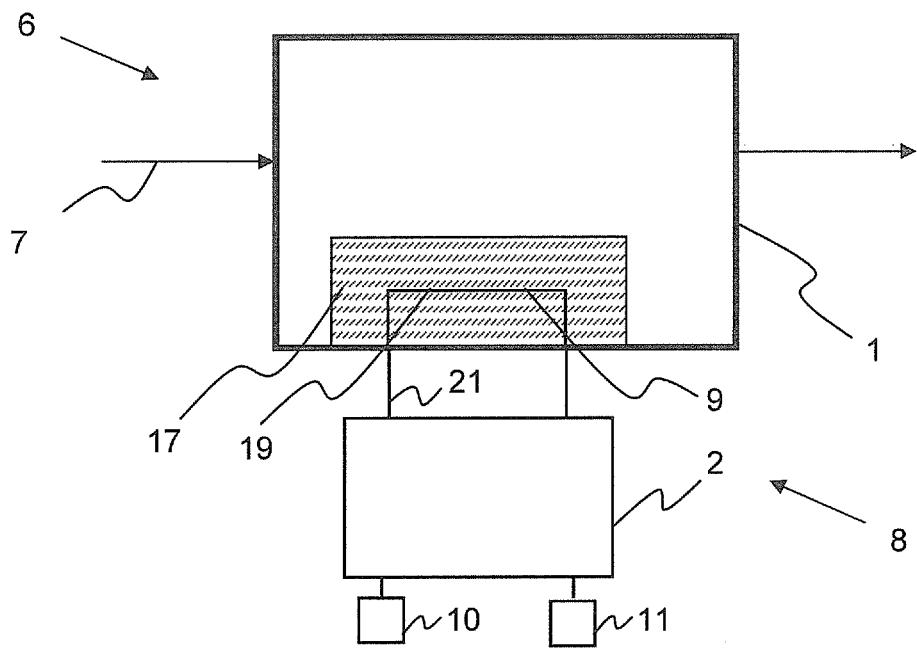
FIG. 4 is a view similar to FIG. 3 of a further exemplary embodiment of an exhaust-gas treatment device.

FIGS. 3 and 4 diagrammatically show two exemplary embodiments of the exhaust-gas treatment device 6 according to the invention, which has an exhaust-gas purification component 1 disposed in a secondary exhaust tract 7. The exhaust-gas purification component 1 is associated with an ignition device 8 which includes an ignition element 9, a capacitor 2, an energy source 11 and a control device 10.

In the exemplary embodiment illustrated in FIG. 3, the ignition element 9 is formed by two electrodes 18. The electrodes 18 have a width extending into the plane of the image, a height 24 and a mutual spacing 23, which define a sub-volume 3. During operation, soot 17 accumulates between the electrodes 18 and thus also fills the sub-volume 3. The capacitor 2 can be discharged through the electrodes 18, as a result of which an electrical current flows between the electrodes through the soot 17. That electrical current flow heats the soot 17 in the sub-volume 3 to an ignition temperature of at least 900° C.

In the exemplary embodiment illustrated in FIG. 4, the sub-volume 3 is formed by an ignition element 9 in the form of a heating wire 19. In this case, the sub-volume 3 corresponds to the volume of the heating wire 19, which is determined by the length and the diameter of the heating wire 19. As a result of the capacitor 2 being discharged by the heating wire 19, the latter is heated, as a result of which the temperature of the soot 17 adjacent the heating wire 19 is likewise increased. A burn-off reaction is thus triggered in the direct vicinity of the heating wire 19 and can propagate through the entirety of the soot 17. An increase in temperature of the soot 17 can be attained with little energy through the use of a heating wire 19.

The present invention permits a complete regeneration of an exhaust-gas purification component 1 in the exhaust system 5 of an internal combustion engine 4 in an energy-efficient manner.

The invention claimed is:

1. A method for regenerating an exhaust-gas purification component, the method comprising the following steps:
   providing a purification structure within a housing, the purification structure being a particle separator or a particle filter, the purification structure having flow passages for exhaust gas, the purification structure having a purification structure total volume;
   charging at least one capacitor to store electrical energy therein;
   heating at least one sub-volume of the purification structure to at least 900° C., the at least one sub-volume being a sub-volume of the purification structure total volume;
   supplying at least a part of the electrical energy stored in the capacitor to at least one ignition having at least one igniter disposed in at least one sub-volume;
   defining the at least one sub-volume as a space through which an electrical current flows from the at least one capacitor and which is directly heated by the electrical current flow to an ignition temperature of at least 900° C. when supplying the electrical energy so that not all of the exhaust gas and not all of the purification component are heated by the electrical energy;
   heating at least a part of an accumulated soot in the sub-volume to a temperature of at least 900° C.;
   converting at least accumulated particles in the at least one sub-volume as a result of an increase in temperature of the at least one sub-volume starting a particle burn-off reaction in the at least one sub-volume oxidizing the particles and extending the particle burn-off reaction to a larger volume of the exhaust-gas purification component.

2. The method according to claim 1, which further comprises supplying at most 2,000 J of electrical energy to the at least one sub-volume.

3. The method according to claim 1, which further comprises supplying at least 63.2% of the energy previously stored in the capacitor to the exhaust-gas purification component within a maximum of 1 second.

4. The method according to claim 1, which further comprises heating different sub-volumes of the at least one sub-volume in successive heating steps.

5. The method according to claim 1, which further comprises charging the at least one capacitor with an initial power of at most 30 W.

6. The method according to claim 1, which further comprises:
   providing at least one ignition having at least one igniter associated with the at least one sub-volume;
   providing the at least one igniter with at least one of electrodes or heating wires disposed in the exhaust-gas purification component;
   providing the at least one capacitor connected to the at least one igniter;
   providing at least one energy source connected to the at least one capacitor;
   providing at least one controller connected to the at least one capacitor; and
   supplying electrical energy to the at least one sub-volume using the at least one of electrodes or heating wires and thereby triggering at least a local regeneration of deposited soot particles.

7. The method according to claim 1, which further comprises supplying at most 2,000 J of electrical energy to the at least one sub-volume at a peak current of greater than 50 A and thereby attaining an electrical discharge of more than 500 W.

8. The method according to claim 1, which further comprises delimiting the at least one sub-volume to a region of the exhaust-gas purification component defined by the at least one igniter.

9. An exhaust-gas treatment device for a secondary exhaust tract of an exhaust system of an internal combustion engine, the exhaust-gas treatment device comprising:

an exhaust-gas purification component having a purification structure within a housing, said purification structure being a particle separator or a particle filter, said purification structure having flow passages for exhaust gas, said purification structure having a purification structure total volume, said purification structure having at least one sub-volume being a sub-volume of said purification structure total volume;

at least one ignition having at least one igniter disposed in said at least one sub-volume, at least one capacitor connected to said at least one igniter, at least one electrical energy source connected to said at least one capacitor and at least one controller connected to said at least one capacitor;

said at least one sub-volume being defined as a space through which electrical current flows and being configured to be directly heated by the electrical current flow to an ignition temperature of at least 900° C. upon supplying the electrical energy so that not all of the exhaust gas and not all of the purification component are heated by the electrical energy; and said at least one sub-volume being configured to heat at least part of an accumulated soot in said at least one sub-volume to a temperature of at least 900° C. to convert at least accumulated particles in said at least one sub-volume as a result of an increase in temperature of said at least one sub-volume starting a particle burn-off reaction in said at least one sub-volume oxidizing the particles and extending the particle burn-off reaction to a larger volume of said exhaust-gas purification component.

10. The exhaust-gas treatment device according to claim 9, wherein said at least one sub-volume has a volume of at most 1,000 mm$^3$.

11. The exhaust-gas treatment device according to claim 9, wherein said at least one capacitor has a capacitance of at most 500 F.

12. The exhaust-gas treatment device according to claim 9, wherein said exhaust-gas purification component is an impactor associated with a second of two end sides of a radial catalytic converter of the exhaust system.

13. The exhaust-gas treatment device according to claim 9, wherein:
said at least one igniter has at least one of electrodes or heating wires disposed in said exhaust-gas purification component; and
said at least one of electrodes or heating wires are configured to supply electrical energy to said at least one sub-volume and thereby trigger at least a local regeneration of deposited soot particles.

14. The exhaust-gas treatment device according to claim 13, wherein said at least one of electrodes or heating wires are configured to supply at most 2,000 J of electrical energy to said at least one sub-volume at a peak current of greater than 50 A and thereby attain an electrical discharge of more than 500 W.

15. The exhaust-gas treatment device according to claim 9, wherein said at least one sub-volume is a delimited region of the exhaust-gas treatment device defined by said at least one igniter.

16. A vehicle, comprising:
an exhaust-gas treatment device for a secondary exhaust tract of an exhaust system of an internal combustion engine, said exhaust-gas treatment device including an exhaust-gas purification component having a purification structure within a housing, said purification structure being a particle separator or a particle filter, said purification structure having flow passages for exhaust gas, said purification structure having a purification structure total volume, said purification structure having at least one sub-volume being a sub-volume of said purification structure total volume, and at least one ignition having at least one igniter disposed in said at least one sub-volume, at least one capacitor connected to said at least one igniter, at least one electrical energy source connected to said at least one capacitor and at least one controller connected to said at least one capacitor;

said at least one sub-volume being defined as a space through which electrical current flows and being configured to be directly heated by the electrical current flow to an ignition temperature of at least 900° C. upon supplying the electrical energy so that not all of the exhaust gas and not all of the purification component are heated by the electrical energy;

said at least one sub-volume being configured to heat at least part of an accumulated soot in said at least one sub-volume to a temperature of at least 900° C. to convert at least accumulated particles in said at least one sub-volume as a result of an increase in temperature of said at least one sub-volume starting a particle burn-off reaction in said at least one sub-volume oxidizing the particles and extending the particle burn-off reaction to a larger volume of said exhaust-gas purification component; and said exhaust-gas purification component configured to be regenerated by:
i) charging said at least one capacitor to store electrical energy therein; and
ii) heating said at least one sub-volume to at least 900° C. through a supply of at least a part of the electrical energy stored in said at least one capacitor.

17. The vehicle according to claim 16, wherein:
said at least one igniter has at least one of electrodes or heating wires disposed in said exhaust-gas purification component; and
said at least one of electrodes or heating wires are configured to supply electrical energy to said at least one sub-volume and thereby trigger at least a local regeneration of deposited soot particles.

18. The vehicle according to claim 17, wherein said at least one of electrodes or heating wires are configured to supply at most 2,000 J of electrical energy to said at least one sub-volume at a peak current of greater than 50 A and thereby attain an electrical discharge of more than 500 W.

19. The vehicle according to claim 16, wherein said at least one sub-volume is a delimited region of the exhaust-gas treatment device defined by said at least one igniter.

20. A vehicle, comprising:
an internal combustion engine;
an exhaust system associated with said internal combustion engine and having a radial catalytic converter, said radial catalytic converter having a main exhaust gas tract, a secondary exhaust gas tract, first and second end sides and ducts through which exhaust gas flows radially;
an exhaust-gas treatment device including an exhaust-gas purification component being an impactor associated with said second end side of said radial catalytic converter, said impactor having an impactor total volume, said impactor having at least one sub-volume being a sub-volume of said impactor total volume;
at least one ignition having at least one igniter disposed in said at least one sub-volume, at least one capacitor connected to said at least one igniter, at least one electrical energy source connected to said at least one capacitor and at least one controller connected to said at least one capacitor;

said at least one sub-volume being defined as a space through which electrical current flows and being configured to be directly heated by the electrical current flow to an ignition temperature of at least 900° C. upon supplying the electrical energy so that not all of the exhaust gas and not all of the purification component are heated by the electrical energy; and said at least one sub-volume being configured to heat at least part of an accumulated soot in said at least one sub-volume to a temperature of at least 900° C. to convert at least accumulated particles in said at least one sub-volume as a result of an increase in temperature of said at least one sub-volume starting a particle burn-off reaction in said at least one sub-volume oxidizing the particles and extending the particle burn-off reaction to a larger volume of said exhaust-gas purification component.

21. The vehicle according to claim 20, wherein:
said at least one igniter has at least one of electrodes or heating wires disposed in said exhaust-gas purification component; and
said at least one of electrodes or heating wires are configured to supply electrical energy to said at least one sub-volume and thereby trigger at least a local regeneration of deposited soot particles.

22. The vehicle according to claim 21, wherein said at least one of electrodes or heating wires are configured to supply at most 2,000 J of electrical energy to said at least one sub-volume at a peak current of greater than 50 A and thereby attain an electrical discharge of more than 500 W.

23. The vehicle according to claim 20, wherein said at least one sub-volume is a delimited region of the exhaust-gas treatment device defined by said at least one igniter.

* * * * *